May 19, 1964   J. H. COWLES   3,133,770
ROLLER RETAINER FOR TAPERED BEARINGS
Filed Jan. 22, 1962   2 Sheets-Sheet 1
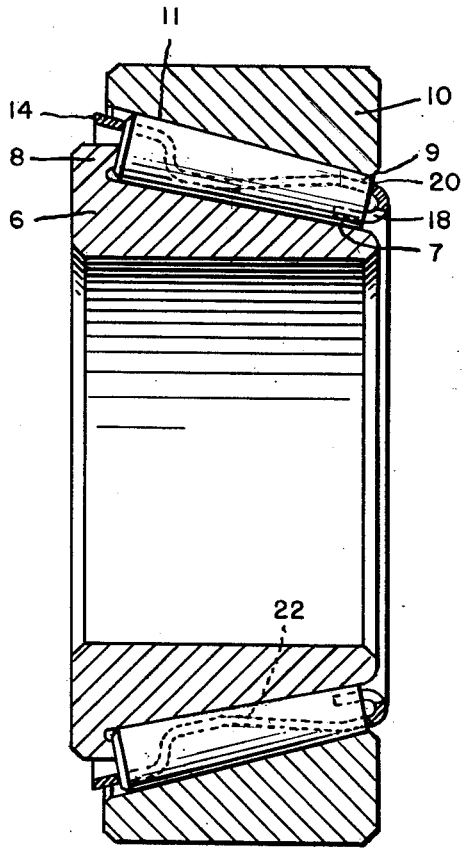
FIG. 1.
FIG. 2.
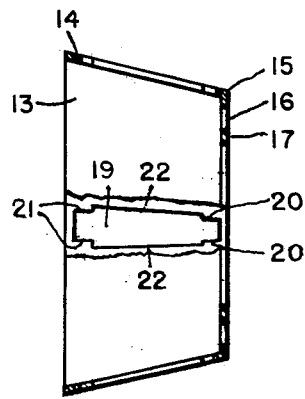
FIG. 3.
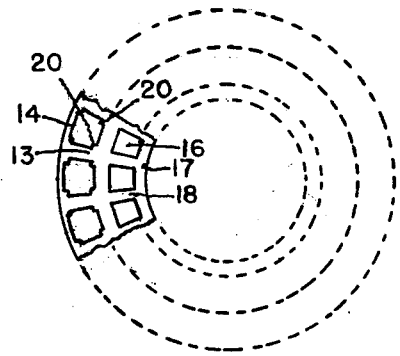
J. H. COWLES
INVENTOR
BY *Mason, Porter, Miller & Stewart*
ATTORNEYS May 19, 1964  J. H. COWLES  3,133,770
ROLLER RETAINER FOR TAPERED BEARINGS
Filed Jan. 22, 1962  2 Sheets-Sheet 2

J. H. COWLES
INVENTOR

BY Mason, Patau, Miller & Stewart

ATTORNEYS

United States Patent Office 3,133,770
Patented May 19, 1964

3,133,770
ROLLER RETAINER FOR TAPERED BEARINGS
John H. Cowles, Forestville, Conn., assignor to The Torrington Company, Torrington, Conn., a corporation of Maine
Filed Jan. 22, 1962, Ser. No. 167,813
5 Claims. (Cl. 308—218)

This specification relates to a roller retainer for tapered bearings having a relatively large ratio of roller length to diameter. The improved retainer is of use in retaining rollers endwise, radially, and laterally with adequate running clearance in the roller pockets for proper freedom of the roller. The design of the retainer is such that trial and error means are not required to make a satisfactory retainer as is sometimes required with full retainment taper roller bearings. Other advantages are the following.

Only one shoulder is required on the inner race as compared to a cage confining the roller from radially outward movement only, which requires two opposite shoulders. A single shoulder race allows easier access to the race and shoulder for grinding and machining purposes.

Assembly of the rollers to the retainer can be made separately, and then the roller and cage assembly placed on the inner race, making a simplified assembly of the bearing.

The construction of the retainer is such that the control or guidance of the retainer can be designed into the cage so as to ride on the roller, or the outer race, or the inner race by controlling the clearances in relation to these members.

The retainer is of one piece construction making an economical construction.

Due to the roller retainer assembly, it can be supplied to those who machine the race surfaces into their equipment.

As illustrating the invention I have shown the preferred form in the accompanying drawings in which:

FIG. 1 is a longitudinal axial cross-section of a tapered roller bearing having the improved roller retainer;

FIG. 2 is a similar section of the blank from which the retainer is shaped;

FIG. 3 is an end view of the smaller end of the blank;

Figure 4:
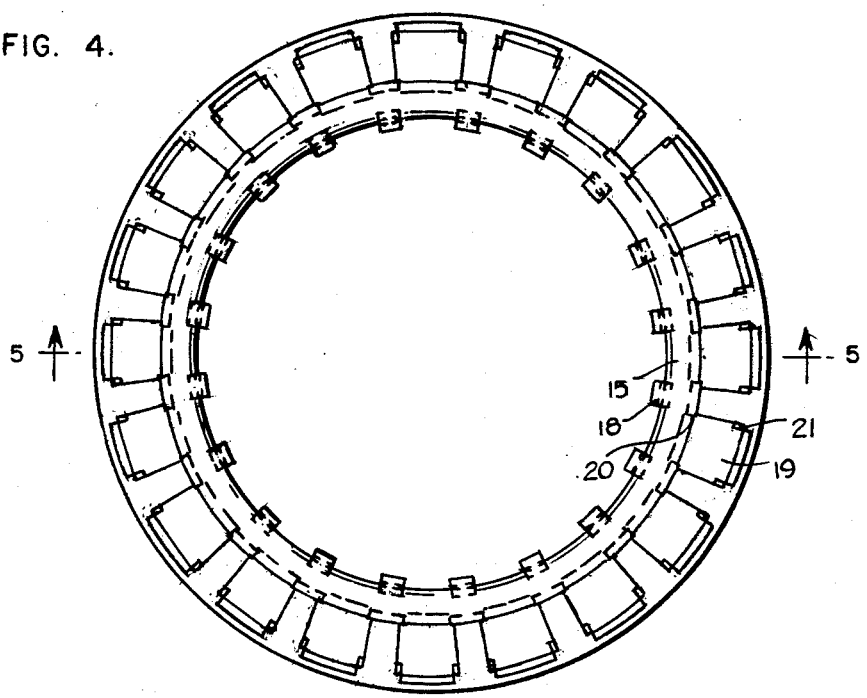
FIG. 4 is a similar end view of the completed retainer.

In brief, the improved retainer is a generally conical unitary structure of sheet metal or other material suitably punched and bent into a form which will prevent the tapered roller from substantial endwise, radial, and lateral movement relative to the retainer.

As illustrated in the drawings, the complete bearing assembly comprises an inner bearing member 6 having an outer conical bearing surface 7 tapering toward the small end. The opposite or big end of the member 6 has a shoulder 8 with an inner surface against which the conical roller 9 abuts.

An outer bearing member 10 has a complementary conical inner bearing surface 11. As illustrated, the slopes of the bearing surfaces 7 and 11 conform to the taper of the roller 9.

The retainer 12 is an integral stamping of sheet metal or other material which has the property of flexibility and resilience.

The retainer is formed from a blank 13, FIG. 2. This is generally conical. At its big end it has a rim 14 against which the larger end of the roller 9 abuts.

The opposite small end of the blank is bent inwardly to provide a flange 15.

This flange 15 is punched as shown at 16, FIG. 3 to provide trapezoidal apertures. In a subsequent operation the inner edge 17 of the flange is trimmed away. This leaves inwardly extending fingers 18, FIG. 3.

Figure 5:
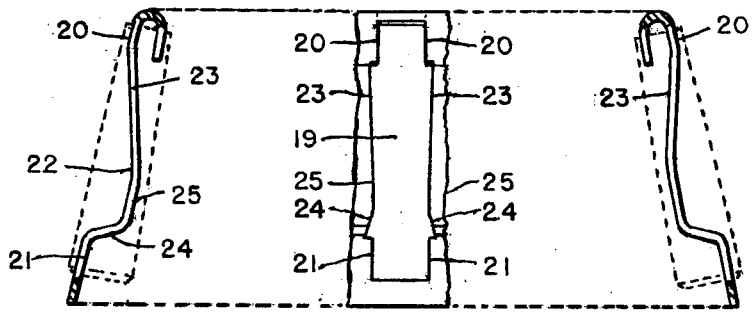
FIG. 5 is a cross-section on the line 5—5 of FIG. 4.

The main body of the blank 13 is punched on its side to provide trapezoidal openings 19 (FIG. 5). The smaller end of the aperture has opposite re-entrant portions 20, 20 (FIG. 5). These portions are spaced less than the corresponding diameter at this point of the roller 9. It follows that the end portions therefore support the small end of the roller from outward dislodgment. The opposite wider end of the conical blank 13 also has opposite re-entrant portions 21, 21 in the aperture 19. In this instance the re-entrant portions 21, 21 also are spaced apart less than the corresponding diameter of the roller 9 at this point, so that the latter is held against outward dislodgment.

The pierced blank 13 is given a formed shape where the fingers 18 are bent into a position substantially parallel to the inner race surface 7, FIGS. 1 and 5, so that the opening is in line with the aperture 19 and the fingers 18 are spaced apart slightly less than the corresponding roller diameter at the small end, thereby holding the roller from inward displacement.

Bending bars 22, 22, FIG. 5, radially inward, places portion 23 in an axially directed plane of the assembly at an angle with 20, provides an intermediate straight section 25 which is substantially parallel with the surface of the inner race 7, and a section 24 directed towards the axis of the assembled bearing. The straight section 25 is designed so that the aperture between adjacent bars over this portion of the bar is less than the corresponding diameter of the roller for this portion of roller length. This section covers a portion of the larger diameter half of the roller length holding the roller from inward radial displacement. However, the plane of the bar is below the center of the roller where the chordal distance of the roller diameter at this point is less than the aperture opening. This provides clearance, allowing free turning of roller.

The portions of the bars, namely 23, and 24 have varying width of aperture due to their radial direction. The clearance between the roller and sections 23 and 24 is minimum substantially at the center or pitch diameter of the roller.

The above description presents then a retainer which with the rollers in place limits the rollers in their radial, lateral, and endwise displacement, but allows free rotation of the rollers in their pockets.

In the installation of the individual rollers, the small end is received between the portions 20, 20 on one side and the tongues 18, 18 on the other side. The larger end of the roller is then placed against the adjacent sides of the portions 25, 25, spreading the latter apart due to their resilience. The large end of the roller then fits against the re-entrant portions 21, 21 and is held there due to the narrow gap between the adjacent portions 25, 25 of the bars.

Since the rollers 9 are held at each end by the retainer, the bearing can be assembled as a unitary structure and handled for transportation or installation as a unit. In the installation it is evident that the large ends of the rollers 9 rest against the rib 8. The rollers are then held in position against displacement or angular distortion due to the structure of the retainer. The latter is free to move with the rollers.

The above illustration of the invention is made by way of example only. The structure is subject to variation in material, form and proportion without departing from the scope of the appended claims.

What I claim is:
1. A retainer for a tapered roller bearing comprising a unitary cone having its side formed of longitudinal bars spaced apart by tapering slots, said bars having longitudi- nally extending corner portions and resilient central portions, said central portions being directed inwardly at the larger end to a section inclined to the longitudinal axis of the retainer and continuing in a section substantially parallel to the axis of the retainer to the opposite smaller end of the cone.

2. A retainer for a tapered roller bearing comprising a unitary cone having its side formed of longitudinal bars spaced apart by tapering slots, said bars having longitudinally extending corner portions, the central portions of the bars being directed inwardly at the larger end to a section inclined to the longitudinal axis of the retainer and continuing in a section substantially parallel to the axis of the retainer to the opposite smaller end of the cone, and inwardly projecting fingers on the smaller end of the cone opposite the adjacent corner portions of the bars.

3. A retainer for a tapered roller bearing comprising a unitary cone having its side formed of longitudinal bars spaced apart by tapering slots, said bars having longitudinally extending corner portions and resilient central portions, said central portions of the bars being bent inwardly into a line approximately parallel to said corner portions, and inwardly projecting fingers on the smaller end of the cone opposite the adjacent corner portions of the bars and aligned with the central portions of the bars.

4. A tapered roller bearing comprising inner and outer conical race members, a unitary conical retainer and a series of tapered rollers, said retainer having its side formed of longitudinal bars spaced apart by tapering slots proportioned to receive said tapered rollers, said bars having longitudinally extending corner portions spaced apart less than the diameters of the roller at its ends, the resilient central portions of the bars being bent inwardly and toward each other to a spacing less than the diameter of the rollers at said central portion and inwardly projecting fingers on the smaller end of the retainer opposite the adjacent corner portions of the bars and approximately parallel thereto.

5. A tapered roller bearing comprising an outer conical race member, an inner conical race member having a shoulder on its larger end, a unitary conical retainer and a series of tapered rollers having their larger ends abutting the said shoulder, said retainer having its side formed of longitudinal bars spaced apart by tapering slots proportioned to receive said tapered rollers, said bars having longitudinally extending corner portions spaced apart less than the diameters of the roller at its ends, the resilient central portions of the bars being bent inwardly and toward each other to a spacing less than the diameter of the rollers at said central portion and inwardly projecting fingers on the smaller end of the retainer opposite the adjacent corner portions of the bars and approximately parallel thereto.

References Cited in the file of this patent

UNITED STATES PATENTS

| | | |
|---|---|---|
| 1,395,244 | Andre | Nov. 1, 1921 |
| 1,513,999 | Kifer | Nov. 4, 1924 |
| 1,824,787 | Nolan | Sept. 29, 1931 |
| 1,901,967 | Hoover | Mar. 21, 1933 |

FOREIGN PATENTS

| | | |
|---|---|---|
| 1,049,167 | Germany | Jan. 22, 1959 |